March 24, 1953   L. SKEEL   2,632,536
LOCKING DEVICE
Filed Nov. 28, 1950
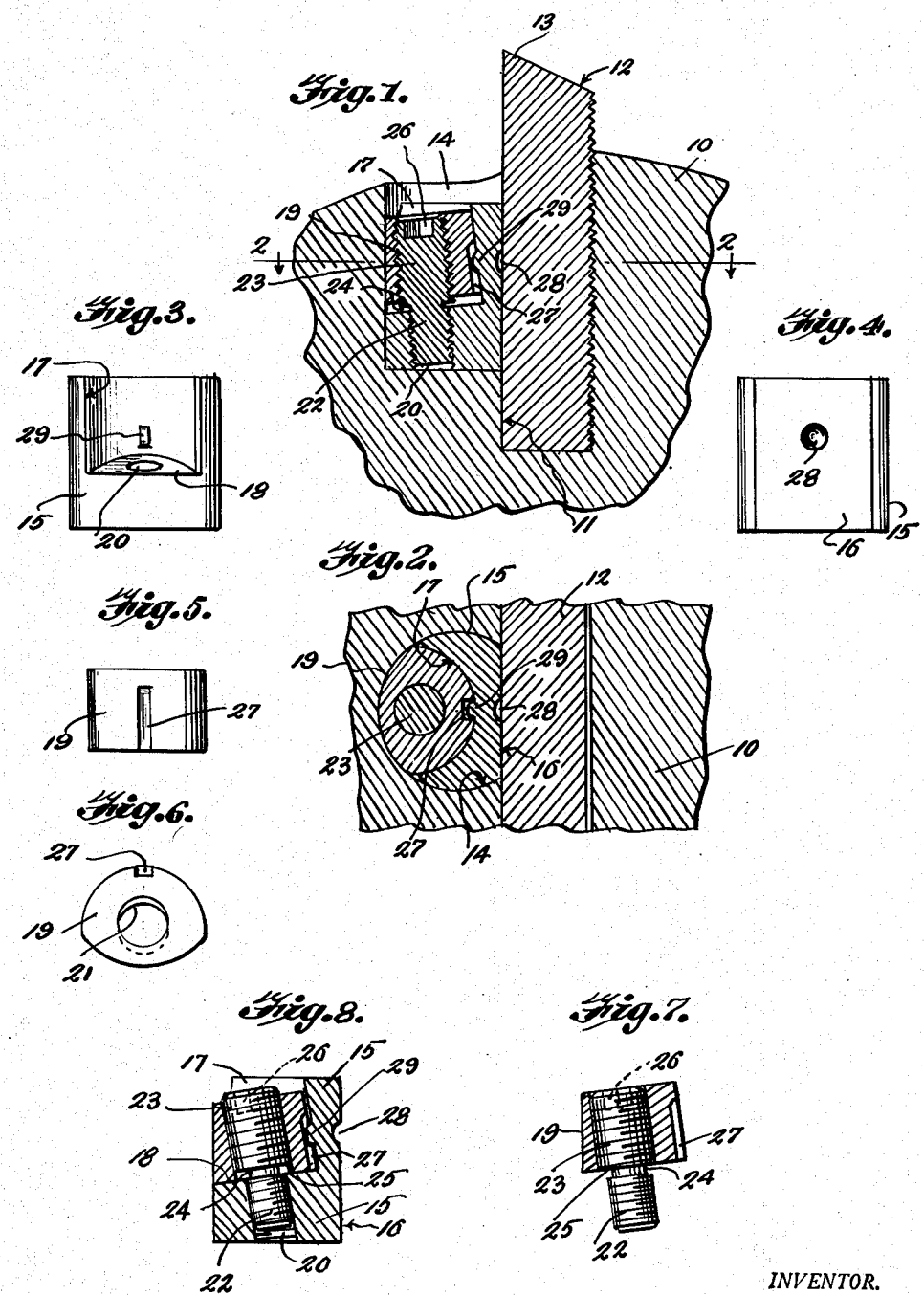
INVENTOR.
LEWIS SKEEL
BY
E. F. Salter
ATTORNEY Patented Mar. 24, 1953

2,632,536

UNITED STATES PATENT OFFICE 2,632,536

LOCKING DEVICE

Lewis Skeel, Meadville, Pa., assignor to
Robert W. Thomas, Meadville, Pa.

Application November 28, 1950, Serial No. 197,906

1 Claim. (Cl. 189—36)

This invention relates to a device which is especially adapted for locking or securing in proper position of adjustment the blades or cutters of milling tools, boring bars, or the like. It is also applicable for the same purpose in association with stationary or non-rotatable tool holders such as are found in lathes, shapers, etc., and further can be used to interlock the otherwise relatively movable parts of any mechanism to which it may be adaptable.

The invention will be described specifically in connection with an illustrated form of a rotary mill body carrying one or more blades, each locked in place by the improved locking or securing device that comprises a carrier having a wedge element mounted therein and connected thereto by a differential screw. The assembled parts must have a somewhat critical relationship for effective limited movement to obtain locking or release actions when the screw is manually adjusted. It has been possible, as when removing the entire unit for resharpening and adjusting the blades, for a curious mechanic to disassemble the unit and in many cases he has been unable to reassemble the parts to establish their rather critical relationship.

Accordingly, it is the primary object of the present invention to provide a fool-proof multi-part locking device in which the parts have only limited relative movement and cannot be completely separated once they have been properly assembled. In the illustrated embodiment this is accomplished by so constructing and arranging the parts as to limit axial movement of the wedge element under the action of the screw, and by providing a longitudinal recess in the wedge element and a protuberance or key on the carrier that extends into the recess to prevent relative rotation of the wedge element and carrier.

Another major object is to create a protuberance on the socket surface of the carrier member by staking it from the outer surface, the protuberance thus being integral and no machining operations being required for its creation.

These and other important and subordinate objects should clearly appear from a study of the following description when taken in conjunction with the accompanying drawing, wherein:

Figure 1 is a fragmentary section of a milling cutter head having a blade locked therein by a completely assembled locking unit embodying the present invention.

Figure 2 represents a section taken on the plane of line 2—2, Figure 1.

Figure 3 shows the carrier as seen when looking transversely into its socket.

Figure 4 is a view showing the opposite side of the same carrier.

Figure 5 is an elevation of the recessed side of the wedge element.

Figure 6 is a bottom plan view of the wedge element.

Figure 7 is a sectional view of the wedge and differential screw assembly.

Figure 8 shows the unit of Figure 7 inserted in the carrier and staked into permanent assembly.

It should be understood that the protuberance and depression are included in Figs. 3 and 4 for convenience of illustration and do not appear in actual practice until assembly as in Fig. 8.

With continued reference to the drawing, a rotary tool body 10 has a slot 11 at its periphery for reception of a conventional flat-sided blade 12 provided with a cutting edge 13. Offset from the slot and opening thereinto is a hole or recess 14 of cylindrical curvature, the axis of which is parallel to the slot. The chordal plane of the opening must be no more than 180 degrees. A complemental carrier or clamp 15 slides freely into the recess 14 and has a flat surface 16 for applying pressure to the blade by way of the chordal opening.

The carrier 15 is provided with a cylindrically curved socket 17 that opens toward the rear wall of the recess 14. The axis of this socket is slightly inclined to that of the recess 14 and hence its flat bottom face 18 is not perpendicular to the blade 12, and its curved wall forms a wedging surface for coaction with a complemental surface on a wedging element 19. The other curved surface of the wedge is complemental to the recess 14.

The carrier has a tapped hole 20 with threads of relatively small pitch and the wedge has a substantially larger hole 21 with threads of greater pitch. These holes must be aligned and coincident with the axis of the socket 17. A differential screw has two integral portions 22 and 23, respectively, complemental to these holes and separated by a peripheral gap 24 that forms (as later seen) an important shoulder 25. Thus, it will be seen a few turns of a wrench, inserted in the socket 26, will in one direction move the wedge element 19 upwardly to lock the entire assembly and in the other direction downwardly to permit blade release.

There is a definite or fairly critical relationship of the elements of the improved unitary locking device that should be had prior to insertion of the device into the cutter body or head 10. This can be obtained by first inter-connecting the screw and wedge to form a unit approximately as seen in Figure 7, and then turning this unit within the socket 17 until sufficient threads on the part 22 of the screw have entered the hole 20. Then, by slipping the assembly into place, locking and release can readily be effected in the manner explained in the next preceding paragraph.

However, upon removal of blades for any reason curious persons may play with the assembly or take it apart, and thereafter be unable to properly reassemble the parts. It is the purpose of this invention to positively prevent such tampering, and this is accomplished as follows:

A longitudinal recess or groove 27 is ground or milled into that portion of the wedge which later directly faces the blade. The wedge and screw are then put together and inserted in the socket of the carrier as in Figure 8, and the three parts properly adjusted for use in the particular tool head. Then the assembly is rigidly mounted in a cradle with the flat 16 of the carrier facing a staking tool. The latter is rammed against the carrier to produce a depression 28 directly opposite the recess 27, thus causing sufficient displacement of metal into the recess to form a protuberance or key element 29 that locks the wedge element against rotation while permitting it to slide up and down. This alone does not prevent complete separation of the parts but the up and down movement is limited to about the thickness of the gap 24, as follows:

If the screw is rotated in such direction as to advance in the hole 20 its shoulder 25 will very soon engage the flat bottom 18 of the socket to positively stop further movement in that direction and thus prevent disengagement of the screw and wedge. The wedge is so related with the screw that at such position of the screw a gap distance exists between the bottom of the wedge and the bottom of the socket. This gap distance is less than the length of that portion of the screw threaded into the carrier, so that reverse rotation or movement of the screw will cause the wedge to engage the bottom of the socket prior to disengagement of the screw and carrier to effect another positive lock. These locks or stops, resulting from the engagement of the shoulder 25 and the bottom of the wedge with the bottom of the socket, act in conjunction with the previously described groove and key means to prevent complete separation of the parts of the unit while permitting adequate longitudinal movement or adjustment of the wedge 19 to effect locking or release after insertion of the assembled unit in the recess 14.

It is believed that the invention is now fully disclosed and that the reader will appreciate that numerous changes may be made within the spirit of the invention and the scope of the appended claim.

What is claimed is:

In a locking assembly, a carrier having a cylindrically curved socket that opens laterally outwardly through one side and axially outwardly through a second side, a complementally curved wedge member freely fitted within said socket the side of said carrier opposite said second side and the wedge member having aligned threaded bores concentric with the axis of said cylindrically curved socket, a differential screw having threads of one lead extending into the bore of said carrier and of another lead extending into the bore of said wedge member the threads being of the same hand, the threads of one lead being of greater diameter than the threads of another lead to form a shoulder therebetween, whereby the screw may be screwed into the carrier to engage the shoulder against the bottom of the socket to stop further movement and prevent disengagement of the screw and wedge, the wedge member being so related with the screw that at such position of the screw a gap distance exists between the bottom of the wedge member and the bottom of the socket, the gap distance being less than the length of that portion of the screw threaded into the carrier, so that reverse movement of the screw will cause the wedge member to engage the bottom of the socket prior to disengagement of the screw and carrier, the wedge member having a longitudinal groove on its outer surface, and said carrier having an internal keying element considerably shorter than and slidably protruding into said groove to prevent relative rotation of said wedge member and carrier.

LEWIS SKEEL.

REFERENCES CITED

The following references are of record in the file of this patent:

UNITED STATES PATENTS

| Number | Name | Date |
| --- | --- | --- |
| 661,655 | Bryce | Nov. 13, 1900 |
| 786,725 | Bryce | Apr. 4, 1905 |
| 1,744,199 | Baker | Jan. 21, 1930 |
| 1,784,256 | Stout | Dec. 9, 1930 |
| 2,259,742 | Edison | Oct. 21, 1941 |
| 2,499,994 | Hart | Mar. 7, 1950 |
| 2,508,437 | Thomas et al. | May 23, 1950 |
| 2,547,789 | Skeel | Apr. 3, 1951 |